Feb. 26, 1946. K. E. MARTIN 2,395,634
MATERIAL HANDLING ATTACHMENT FOR TRACTORS
Filed Dec. 5, 1944 2 Sheets-Sheet 1

INVENTOR.
Kenneth E. Martin
BY Edwin B. Gary
Attorney

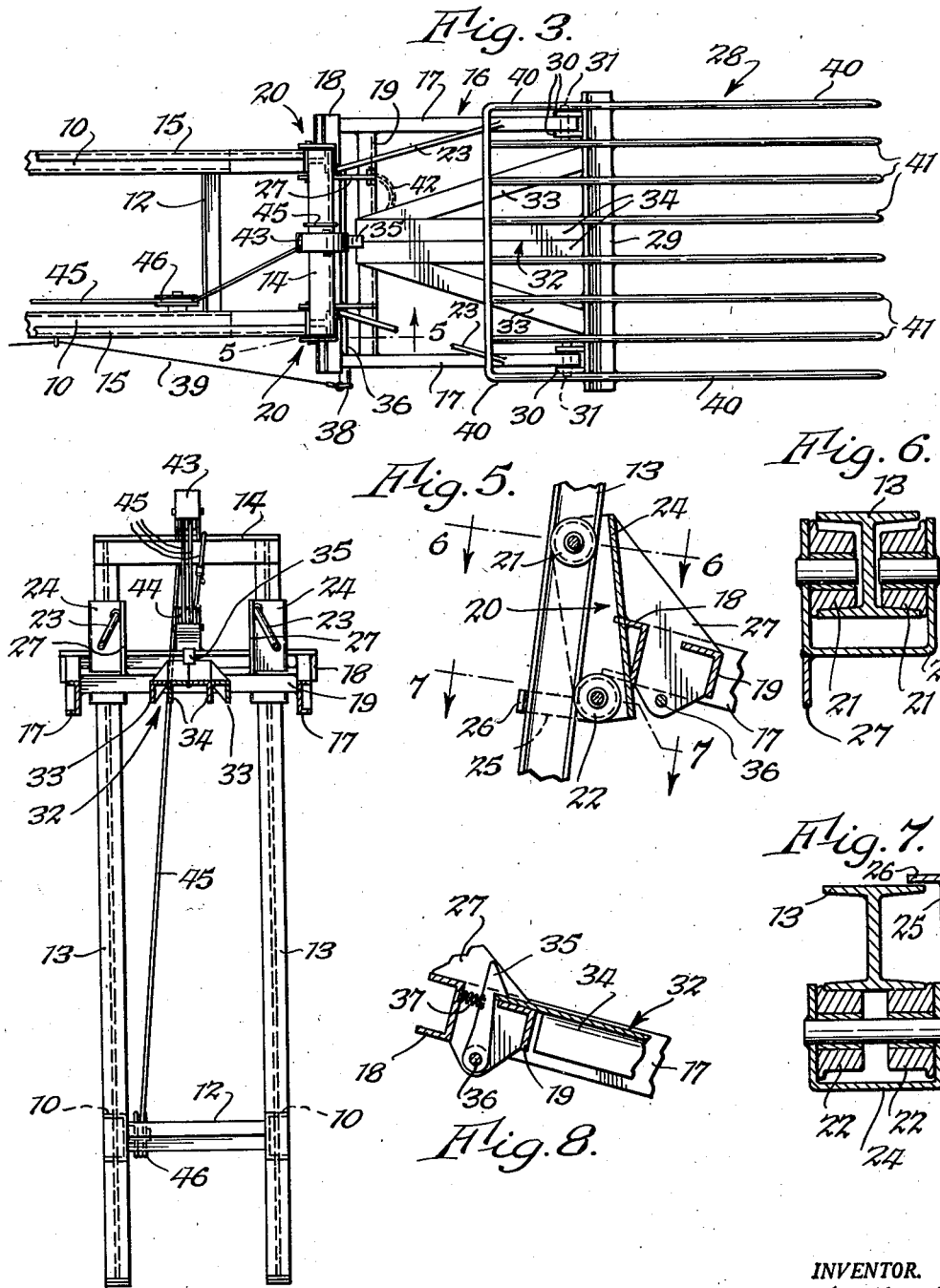

Patented Feb. 26, 1946

2,395,634

UNITED STATES PATENT OFFICE 2,395,634

MATERIAL HANDLING ATTACHMENT FOR TRACTORS

Kenneth E. Martin, Newfane, N. Y.

Application December 5, 1944, Serial No. 566,730

7 Claims. (Cl. 214—113)

This invention relates to material handling devices and, although not necessarily so limited, is characterized by features which render it of particular utility as a tractor attachment for loading manure spreaders and for handling manure and various materials.

One object of the invention is to provide a device which is adapted to handle large amounts of material rapidly and with facility, this object contemplating a device which is so designed that the material will be held in a substantially horizontal position while being transferred to the point at which it is to be discharged and thus be prevented from accidentally falling back upon the tractor or falling off the fork prematurely.

A further object is to provide a device which is so constructed that the material is advanced as it is elevated, whereby to facilitate loading of the spreader or other conveyance.

A still further object is to provide a novel design and arrangement of the parts of the device and in so doing provide for simplicity and economy in construction and for facility in attaching the device to, and in detaching it from, the tractor.

A still further object is to provide a device which may be operated close to the ground with a minimum of interference from surface obstructions.

The invention is illustrated in the accompanying drawings, in which:

Figure 3 is a top plan view of the attachment.

Figure 4 is a vertical section taken along line 4—4 of Figure 2.

Figure 5 is an enlarged detail section taken along line 5—5 of Figure 3.

Figure 1:
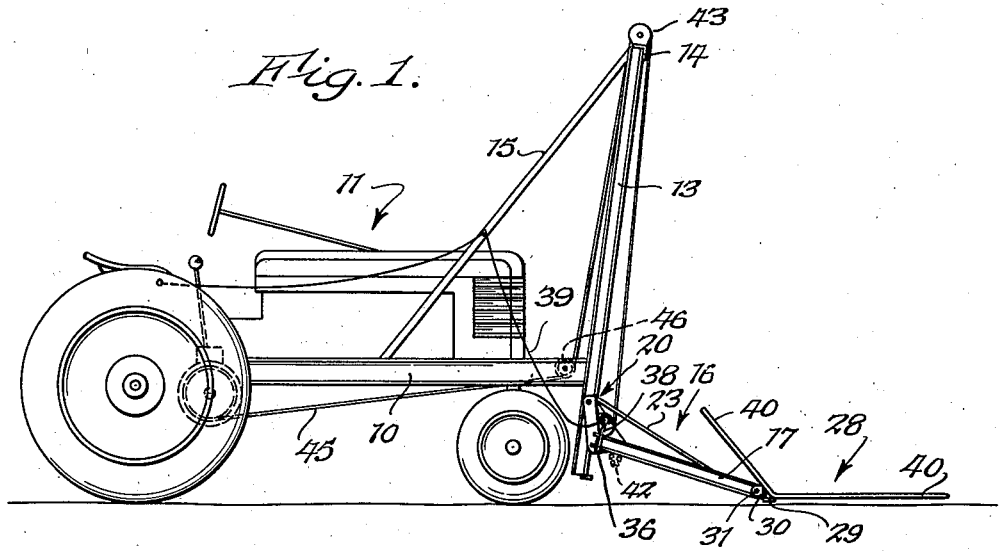
Figure 1 is a side elevation of a tractor to which an attachment embodying the features of the invention is shown applied.

Figures 6 and 7 are enlarged detail sectional views taken along line 6—6 and 7—7, respectively, of Figure 5.

Figure 8 is an enlarged detail sectional view of the latch element which is employed in connection with the fork of the attachment.

The device, as illustrated, includes side frame members 10, in the form of channels, which are preferably bolted, or otherwise detachably connected to the chassis of the tractor 11, and which are connected adjacent their forward ends by a cross-member 12. Upright beams 13, which are carried by the forward ends of the frame members 10, are connected at their upper ends by a cross-member 14, the beams 13 being inclined forwardly and being rigidly braced by tie members 15 which straddle the tractor and connect the upper ends of the beams 13 to rearwardly located portions of the side frame members 10.

The upright beams 13 provide tracks for a carrier 16. The latter is of a general U-shape, having forwardly directed arms 17 and transverse connecting members 18 and 19. Trolleys 20, which are carried by the member 18, each have an upper pair of rollers 21 (Figure 6) which extend into the opposing channels of the beams 13 and engage the backs of the forward flanges of the beams. A lower pair of rollers 22 (Figure 7) which are carried by each of the trolleys engage the outer faces of the same flanges, the trolleys preferably supporting the carrier 16 so that the obtuse angle formed by the arms 17 of the carrier and the beams 13 is substantially the same as the obtuse angle formed by the beams 13 and the side frame members 10, reinforcing rods 23 preferably connecting the upper ends of the trolley housings 24 to the outer ends of the arms 17 of the carrier. In order that the beams 13 may be of standard I cross-section as shown, the upper rollers of each trolley are tapered while the lower rollers are straight. Both upper and lower rollers are, however, flanged so that the marginal edges of the forward flanges of the beams may be engaged by the rollers to prevent lateral movement of the carrier. Any tendency of the lower rollers to swing away from the beams 13 is prevented by straps 25. The latter are carried by the lower ends of the housings of the trolleys and have inwardly directed ends 26 which extend behind the rear flanges of the beams 13, as best shown in Figure 7. Plates 27, which are attached to the trolley housings 24, are also secured to the connecting members 18 and 19, these plates being spaced inwardly with respect to the ends of the arms 17.

A fork 28 is supported by the carrier 16, a transversely-extending angle member 29 of the fork having extensions 30 which are pivotally connected to the outer ends of the arms 17 by pins 31. A tail-piece 32 which is carried by the angle member 29 includes side members 33 which converge toward, and which at their rear ends are joined to, the rear end of a two-section central channel member 34, the side flanges of the said members being cut away at the end of the tail-piece. The tail-piece 32 serves as a counterweight and is operative when the load carried by the fork 28 is discharged, to restore the fork to its normal, load-receiving position. Normally the fork is releasably secured in such position by a latch element 35 (Figure 8) which is engageable with the end of the tail-piece when it rests upon the cross member 19. The latch element 35 is carried on a rod 36 which is carried between the plates 27 and is held in engagement with the tail-piece by a spring 37, the latter acting upon the cross member 18 of the carrier. At its outer end, the rod 36 carries an arm 38 to which an operating line 39 is connected, the said line leading to a point within convenient reach of the operator of the tractor and being operable to release the latch element whenever this is desired.

Figure 2:
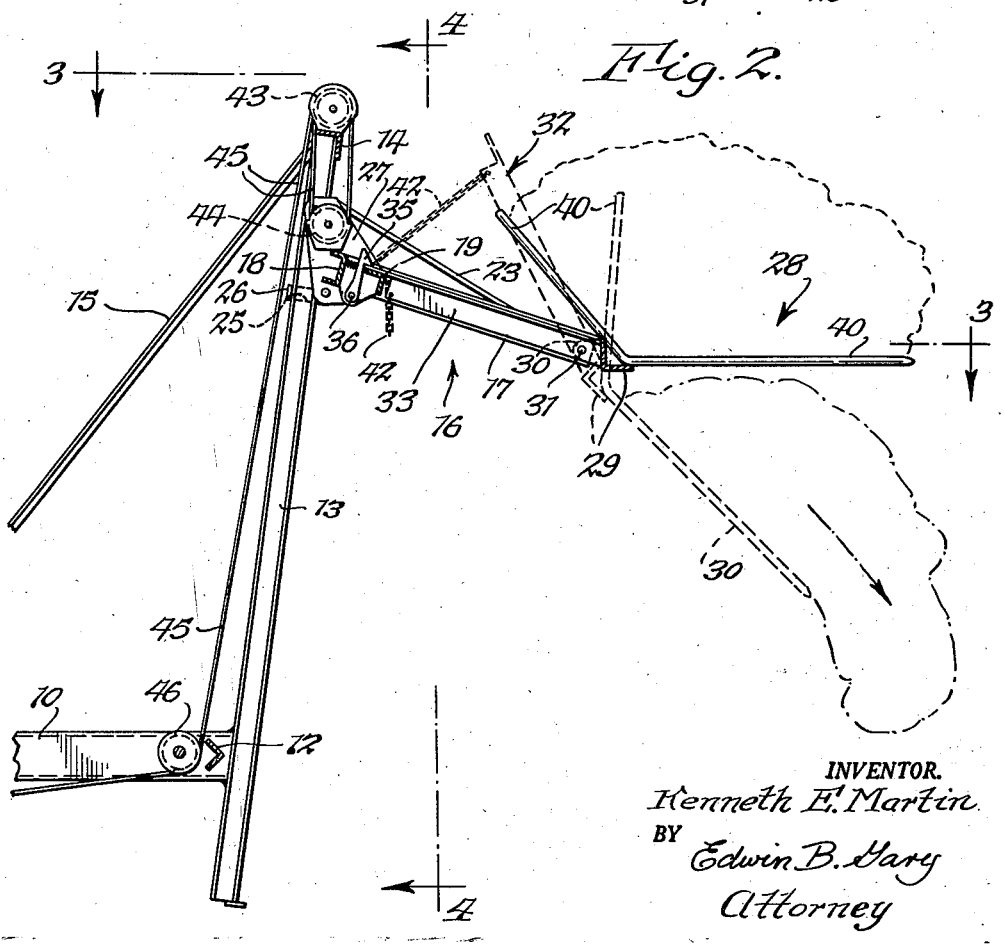
Figure 2 is an enlarged sectional view through the attachment.

The fork 28 may be of any suitable type. As best shown in Figure 3, it includes a U-shaped outer member 40 and a series of rods 41, the said member and rods being welded or otherwise secured to the angle member 29. Those portions of the member 40 and rods 41 which extend ahead of the angle member 29 comprise the tines of the fork while those portions behind the angle member extend angularly upwardly and serve as a back to limit movement of the material onto the fork. In this connection it is to be noted that when the latch element 35 is actuated to release the fork, the weight of the load causes the fork to tip forwardly as shown in dotted lines in Figure 2. When this occurs, the load is discharged by gravity, a chain 42 preventing tipping of the fork to such an extent as to render the tail-piece inoperative as a counterweight to restore the fork to its load receiving position.

The invention contemplates the use of the power take-off of the tractor for elevating the material handled by the device. To this end the cross member 14 which is carried by the upright beams 13 and the connecting member 18 of the carrier carry pulley blocks 43 and 44, respectively, the cable 45 which connects the said pulley blocks leading under a guide pulley 46 (Figure 2) to a suitable winch (not shown).

Normally the fork is secured in the position shown in Figure 1. In the use of the attachment, the fork is lowered to the desired elevation and is caused to move beneath the material to be handled as the tractor is driven forward. When the fork is loaded, it is elevated to a position above the spreader if the attachment is being employed for loading purposes, the latch element 35 being released when the fork reaches the desired elevation. Thereupon the fork is permitted to tip forward to discharge the load into the spreader; and after this occurs the tail-piece restores the fork to its normal load receiving position, the latch element automatically reengaging the tail-piece as the latter reaches such position. The carrier may then be lowered preparatory to reloading the fork in the manner described.

From the foregoing, it will be apparent that the tines of the fork remain in a horizontal position throughout the entire range of movement of the carrier from the load receiving position to the load discharging position. The material being handled, therefore, will remain on the fork and will not fall back upon the tractor. It will be noted in this connection that as the fork is elevated it is advanced. Hence the material may be readily discharged into a spreader or other conveyance.

The angular relation between the beams 13, the carrier and the fork has the advantage that the fork may be operated close to the ground without danger of the beams and carrier encountering surface obstructions. A further advantage obtained is that the forces acting upon the attachment while the fork is being loaded will be distributed in such a manner that none of the parts will be subjected to excessive strains. The manner in which the fork is counterweighted also has the advantage that heavy loads may be handled with facility.

Various changes in the shape, size and arrangement of the parts of the device and in the use of the device may be made without departing from the spirit and scope of the invention.

I claim as my invention:

1. An attachment for the purpose described including upwardly and forwardly extending guide means, a carrier having spaced-apart cross members and forwardly directed arms, trolley means attached to one of said cross members and engaging said guide means, said trolley means supporting said carrier so that said arms extend forwardly and downwardly, a fork pivotally connected to and between the outer ends of said arms for movement between load receiving and load discharging positions, means connected to said last mentioned cross member for elevating and lowering said carrier, said fork being supported by said carrier so that the tines thereof are substantially horizontal throughout the entire range of movement of the carrier, a tail-piece carried by said fork, said tail-piece serving as a counterweight to restore said fork from said load discharging position to said load receiving position and engaging the other of said cross members in said last mentioned position, a latch element, resilient means for causing said latch element to engage said tail-piece when said tail-piece engages the other of said cross members, a shaft which carries said latch element, and means for rocking said shaft to release said tail-piece to permit said fork to discharge a load.

2. An attachment of the character described including a carrier having a cross member and forwardly extending arms, a fork pivotally connected to and between the outer ends of said arms for movement to load receiving and load discharging positions, means connected to said cross member for elevating and lowering said carrier, means for releasably securing said fork in said load receiving position, said means including a tail-piece which is carried by said fork and which is located between and in substantially the same plane as said arms, said tail-piece serving as a counterweight and being operative to restore said fork from said load discharging position to said load receiving position, and a latch element which is engageable with said tail-piece.

3. A tractor attachment for the purpose described including a carrier having spaced-apart cross members and forwardly directed arms, a fork pivotally connected to and between the outer ends of said arms for movement to load receiving and load discharging positions, means connected to one of said cross members for elevating and lowering said carrier, a tail-piece carried by said fork, said tail-piece being located between said arms and being engageable with the other of said cross members in the load receiving position of said fork, and a latch element which is engageable with said tail-piece to releasably secure said fork in said load receiving position.

4. An attachment of the character described including a carrier having a cross member and forwardly extending arms, a fork pivotally connected to and between the outer ends of said arms for movement to load receiving and load discharging position, means connected to said cross member for elevating and lowering said carrier, means for releasably securing said fork in said load receiving position, said last mentioned means including a tail-piece which is carried by said fork and which is located between said arms, said tail-piece serving as a counterweight and being operative to restore said fork from said load discharging position to said load receiving position, a latch element, resilient means for holding said latch element in engagement with said tail-piece, and means for releasing said latch element against the action of said resilient means.

5. An attachment of the character described including a carrier having a cross member and forwardly extending arms, a fork pivotally connected to and between the outer ends of said arms for movement to load receiving and load discharging positions, means connected to said cross member for elevating and lowering said carrier, a tail-piece which is carried by said fork and which is located between said arms, said tail-piece serving as a counterweight and being operative to restore said fork from said load discharging position to said load receiving position, means for releasably securing said fork in said load receiving position, said last mentioned means including a cross shaft, an arm on said cross shaft, resilient means acting against said latch element for holding the latter in engagement with said tail-piece, and means connected to said arm for rocking said cross shaft to release said latch element against the action of said resilient means.

6. An attachment of the character described including a carrier having spaced-apart cross members and forwardly extending arms, a fork pivotally connected to and between the outer ends of said arms for movement to load receiving and load discharging positions, means connected to one of said cross members for elevating and lowering said carrier, a tail-piece which is carried by said fork and which is located between said arms, said tail-piece serving as a counterweight, being operative to restore said fork from said load discharging position to said load receiving position and being engageable with the other cross member in the load receiving position of said fork, and means for releasably securing said tail-piece to said other cross member.

7. An attachment of the character described including a carrier having spaced-apart cross members and forwardly extending arms, a fork pivotally connected to and between the outer ends of said arms for movement to load receiving and load discharging positions, means connected to one of said cross members for elevating and lowering said carrier, a tail-piece which is carried by said fork and which is located between said arms, said tail-piece serving as a counterweight, being operative to restore said fork from said load discharging position to said load receiving position and being engageable with the other of said cross members in the load receiving position of said fork, a latch element which is engageable with said tail-piece to secure it against the other of said cross members, and means for releasing said latch element.

KENNETH E. MARTIN.